US007001170B1

(12) United States Patent
Voyatzakis et al.

(10) Patent No.: US 7,001,170 B1

(45) Date of Patent: Feb. 21, 2006

(54) DOUGH PRESS WITH DUAL LOWER PLATENS

(75) Inventors: Andrew D. Voyatzakis, Carlisle, MA (US); George Athanasiadis, Lexington, MA (US)

(73) Assignee: Somerset Industries, Inc., N. Billerica, MA (US)

(*) Notice: Subject to any disclaimer, the term of this patent is extended or adjusted under 35 U.S.C. 154(b) by 125 days.

(21) Appl. No.: 10/655,392

(22) Filed: Sep. 4, 2003

Related U.S. Application Data

(63) Continuation-in-part of application No. 10/236,630, filed on Sep. 6, 2002, now Pat. No. 6,769,898.

(51) Int. Cl.
*A21C 11/00* (2006.01)

(52) U.S. Cl. ...................... 425/183; 425/318; 425/394; 425/412; 99/349; 426/496; 426/512

(58) Field of Classification Search ................ 425/182, 425/193, 318, 394, 404, 412; 99/349; 426/496, 426/512

See application file for complete search history.

(56) References Cited

U.S. PATENT DOCUMENTS 3,726,149 A * 4/1973 Ilines ..................... 425/192 R
4,060,365 A 11/1977 Duarte et al.
4,559,002 A 12/1985 Atwood
4,571,775 A 2/1986 Leonard
5,074,778 A 12/1991 Betts, Jr. et al.
5,417,149 A 5/1995 Raio et al.
5,800,844 A 9/1998 Raio et al.
6,136,361 A * 10/2000 D'Alterio ................... 426/512
6,332,768 B1 12/2001 Raio et al.
6,416,312 B1 * 7/2002 Gonser et al. .............. 425/423

* cited by examiner

*Primary Examiner*—Robert Davis
*Assistant Examiner*—Thu Khanh T. Nguyen
(74) *Attorney, Agent, or Firm*—Altman & Martin

(57) ABSTRACT

A manually operated dough press comprising a frame with a base and a housing. A shaft mounted for reciprocating motion extends from an opening in the housing and an upper platen is attached to the lower end of the shaft. A pair of lower platens are pivotally mounted to the base so that they can be alternately aligned with the upper platen. A drive mechanism moves the shaft between an open position where the upper platen is spaced from the aligned lower platen and a closed position where dough on the aligned lower platen is compressed between the upper and lower platens. The drive mechanism includes a mechanism for latching the upper platen in the closed position.

10 Claims, 7 Drawing Sheets

DOUGH PRESS WITH DUAL LOWER PLATENS

CROSS-REFERENCES TO RELATED APPLICATIONS

The present application is a continuation-in-part application of U.S. application Ser. No. 10/236,630, dated Sep. 6, 2002 for DOUGH PRESS in the names of Andrew D. Voyatzakis and George Athanasiadis, now U.S. Pat. No. 6,769,898.

STATEMENT REGARDING FEDERALLY SPONSORED RESEARCH OR DEVELOPMENT

Not Applicable

REFERENCE TO A SEQUENCE LISTING, A TABLE, OR A COMPUTER PROGRAM LISTING COMPACT DISK APPENDIX

Not Applicable

BACKGROUND OF THE INVENTION

1. Field of the Invention

The present invention relates to restaurant equipment, more particularly, to manual presses for producing flat sheets of dough.

2. Description of the Related Art

The purpose of a dough press is to flatten a quantity of dough to produce, for example, a pizza crust. A typical manual dough press has two horizontal platens with opposing working surfaces. Normally, the surfaces are flat, except when special shapes are desired, for example, to create a raised crust on a pizza. The lower platen is fixed vertically, but is typically designed to swing out from the press so that dough can be removed from or placed on the working surface. The upper platen is attached to a mechanism that moves the upper platen vertically, while remaining aligned and parallel with the lower platen. The mechanism is manually operated by a handle that extends from the front of the press. Raising and lowering the handle respectively raises and lowers the platen. In use, the lower platen is pivoted out from the press, a quantity of unformed dough is placed on the lower platen, and the lower platen is returned to its operative position. The operator lowers the handle, putting enough pressure on the handle to flatten and shape the dough as desired. Optionally, the dough press may contain a stop whereby the upper platen's range of travel is limited. Optionally, one or both platens incorporate heaters for warming the dough to make it more amenable to being shaped. After the dough is pressed to the desired shape, the handle is raised, the lower platen is swung out from the press and the now-shaped dough is removed.

FIG. 2 illustrates two aspects of the platen-lowering mechanism of manual dough presses of the prior art. The upper platen 200 is attached to a shaft 202 that reciprocates within a cylinder 204 so that the platens remain aligned and parallel during operation. The shaft is driven manually by a rack and pinion, where the rack 206 is mounted vertically to the shaft 202. The rack 206 travels vertically through a slot 208 in the cylinder wall. The pinion 210 is attached to an axle 214 that is a portion of the handle 212. As the handle 212 is moved up or down, the pinion 210 rotates, causing the shaft 202 to reciprocate within the cylinder 204. In order to retain the upper platen in the position desired by the operator, a counterbalance mechanism is employed. A collar 216 is tightened around the axle portion 214 of the handle 212 to which the pinion 210 is attached. This has the effect of providing enough friction to overcome the weight of the platen 200 and shaft 202 to hold the platen 200 in the vertical position desired by the operator.

There are several shortcomings to this design. The shaft/cylinder combination must be lubricated on a regular basis in order to work smoothly and not bind. With the shaft 202 attached directly to the upper platen 200, lubricant slides or is pushed down the shaft 202 and can end up on the platen 200. Because the working surface of the platen 200 is in contact with the dough being pressed, great care must be taken to make sure that the lubricant does not find its way to the dough press surface of the platen 200, otherwise the surface may become contaminated and, in turn, contaminate the dough. If the shaft/cylinder combination is not lubricated on a regular basis, it may bind and cause breakage of the teeth of the rack 206 and/or the pinion 210.

Regarding the counterbalance mechanism, when raising the platen, the operator must overcome, not only the not insignificant weight of the platen, but the friction of the collar. In addition, the collar must be regularly adjusted as it or the axle wears. If the collar is too tight, the it takes more work by the operator to raise and lower the platen. If the collar is too loose, the platen may fall, creating a safety hazard, such as crushed fingers. Eventually, the collar or handle must be replaced as one or the other wears out. Care must also be taken that lubricant does not contaminate the collar, and thereby reduce its effectiveness.

Some prior art dough presses incorporate a mechanism for maintaining downward pressure on the upper platen without need for the operator to maintain manual pressure on the handle. One such mechanism uses a pneumatic cylinder, but also requires a source of high pressure air with all of the accompanying apparatus, such as a compressor and a storage tank. Another mechanism uses a hydraulic cylinder, but also requires a source of hydraulic fluid. A third mechanism uses a linear electric motor, which requires a source of electric power. All of these prior art mechanisms add cost and complexity to the manual press.

BRIEF SUMMARY OF THE INVENTION

An object of the present invention is to provide a manual dough press that requires less maintenance and cleaning than dough presses of the prior art in order to keep the food preparation surfaces from becoming contaminated.

Another object is to provide a manual dough press in which the upper platen can maintain pressure on the dough without the need of the operator.

A further object is to provide a manual dough press that provides a counterbalance mechanism that requires no maintenance and simpler adjustment than dough presses of the prior art.

A further object is to provide a manual dough press in which the upper platen requires much less effort to move up and down than dough presses of the prior art.

A still further object is to provide a manual dough press in which the dough press will mount two lower platens simultaneously and wherein, while dough on one lower platen is being pressed, dough can be removed from and placed on the other lower platen, enhancing efficiency of operation.

One aspect of the present invention is a dough press designed for manual operation that includes a frame with a base and housing, a shaft to which the upper platen is attached extending from the housing through an opening and mounted for reciprocating motion through the opening, an upper platen mounted to the shaft and having a working surface, a lower platen mounted to the base with a working surface opposed to, substantially parallel to, and spaced from the upper platen working surface, a fixed interlocking component within and secured to the housing, a reciprocating interlocking component secured to the shaft within the housing, the reciprocating interlocking component being complementary to the fixed interlocking component and arranged for reciprocating movement within the fixed interlocking component, and a drive mechanism including a handle external to the housing that rotates a pair of spaced cams having spiral slots in which ride the ends of a rod fixed to the shaft, whereby, as the handle is moved, the cams rotate and cause reciprocating movement of the shaft.

Another aspect of the present invention is a dough press designed for manual operation that includes a frame with a base and housing, a shaft to which the upper platen is attached extending from the housing through an opening and mounted for reciprocating motion through the opening, an upper platen mounted to the shaft and having a working surface, a pair of lower platens pivotally mounted to the base with working surfaces opposed to, substantially parallel to, and spaced from the upper platen working surface, where each lower platen is pivotable between an aligned position wherein said lower platen is in alignment with the upper platen, and a working position wherein the lower platen is not in alignment with the upper platen and the lower platen working surface is accessible to the operator, and a drive mechanism for reciprocating the shaft between an open position wherein the upper platen is spaced from the lower platen in the aligned position and a closed position wherein dough on the working surface of the lower platen in the aligned position is compressed between the upper platen and the lower platen in the aligned position, the drive mechanism including a mechanism for latching the upper platen in the closed position.

The base and upper housing support the lower and upper platens, respectively, horizontally and in parallel and vertical alignment with each other. The base includes one or two cylindrical projections in the front corners for accepting a cylindrical cavity attached to the lower platen at its rim. The cavity rotates on the projection so that the lower platen can swing away from the base to expose the working surface. Alternatively, the corners include cylindrical cavities and the lower platen includes a mating cylindrical projection.

The upper housing houses the mechanism by which the upper platen is lowered and raised. The upper platen is attached to the bottom of a shaft that reciprocates through a hole in the bottom of the upper housing. An interlocking component on the shaft reciprocates vertically within a complementary interlocking component fixed in the housing. The profile of the interlocking components are such that they cannot move relative to each other except to reciprocate as described. The preferred profile is rectangular, but other profiles providing the same function, such as a dovetail, are contemplated.

A cam design drives the shaft vertically. An external handle rotates an axle which, in turn, rotates a pair of cams along the axle. Each cam includes an elongated slot that spirals away from the axle. A rod fixed to the upper platen shaft and between said cams has a roller at each end that rides within the cam slots. As the cams rotate, the rod moves vertically, causing the upper platen to move up and down.

Optionally, the present invention incorporates a latching mechanism that retains the upper platen in the closed position if the operator releases the handle. The latching mechanism is provided by shaping the outer end of the spiral slots so that minimal upward pressure from the dough causes the roller to push against the outer end of the slot rather than away from the outer end of the slot.

The latching mechanism can be used in conjunction with a pair of lower platens to as much as double efficiency. As the platens compress dough on the lower platen mounted on one side of the press, the operator is setting up dough on the lower platen mounted to the other side of the press. When compression is complete, the operator raises the upper platen, pivots the lower platen out from under the upper platen, pivots the other lower platen under the upper platen, and lowers the upper platen until it latches. The operator is then able to remove the flattened dough and place new dough on the first lower platen.

The present invention employs a torsion bar assembly as a counterbalance. The torsion bar assembly includes an elongated torsion member within a sleeve where the torsion member is fixed to one end of the sleeve. The other end of the torsion member is fixed within the housing. As the sleeve is twisted longitudinally, mechanical energy stored in the torsion member increases. When the rotational force is removed from the sleeve, the stored energy is released, causing the torsion member to return to its normal, untwisted state. A terminator secures the fixed end of the torsion member to the housing. The terminator includes a device for adjusting the tension provided by the torsion bar assembly. A cam follower arm is fixed to and extends radially from the sleeve. A wheel at the end of the follower arm rides along the face of one of the two cams, so that, as the shaft moves downwardly, stored energy increases. The amount of force provided by the torsion bar assembly is adjusted to offset the weight of the upper platen/shaft assembly so that the position of the upper platen is retained where placed by the operator. In addition, the torsion bar assembly provides a "power assist" for the operator in that raising the platen requires much less effort than dough presses of the prior art.

Optionally, the outermost end of the slots are shaped to cause the upper platen to latch in the lowest position to maintain compression on the dough without operator having to maintain pressure on the handle. Minimal upward pressure by the operator overcomes the latching effect.

Optionally, the upper and/or lower platens are capable of heating the dough as it is being flattened. Contemplated methods include embedding heating elements in the platen and using a heating element external to and abutting the platen.

Other objects of the present invention will become apparent in light of the following drawings and detailed description of the invention.

BRIEF DESCRIPTION OF THE DRAWINGS

For a fuller understanding of the nature and object of the present invention, reference is made to the accompanying drawings, wherein.

DETAILED DESCRIPTION OF THE INVENTION

Figure 1:
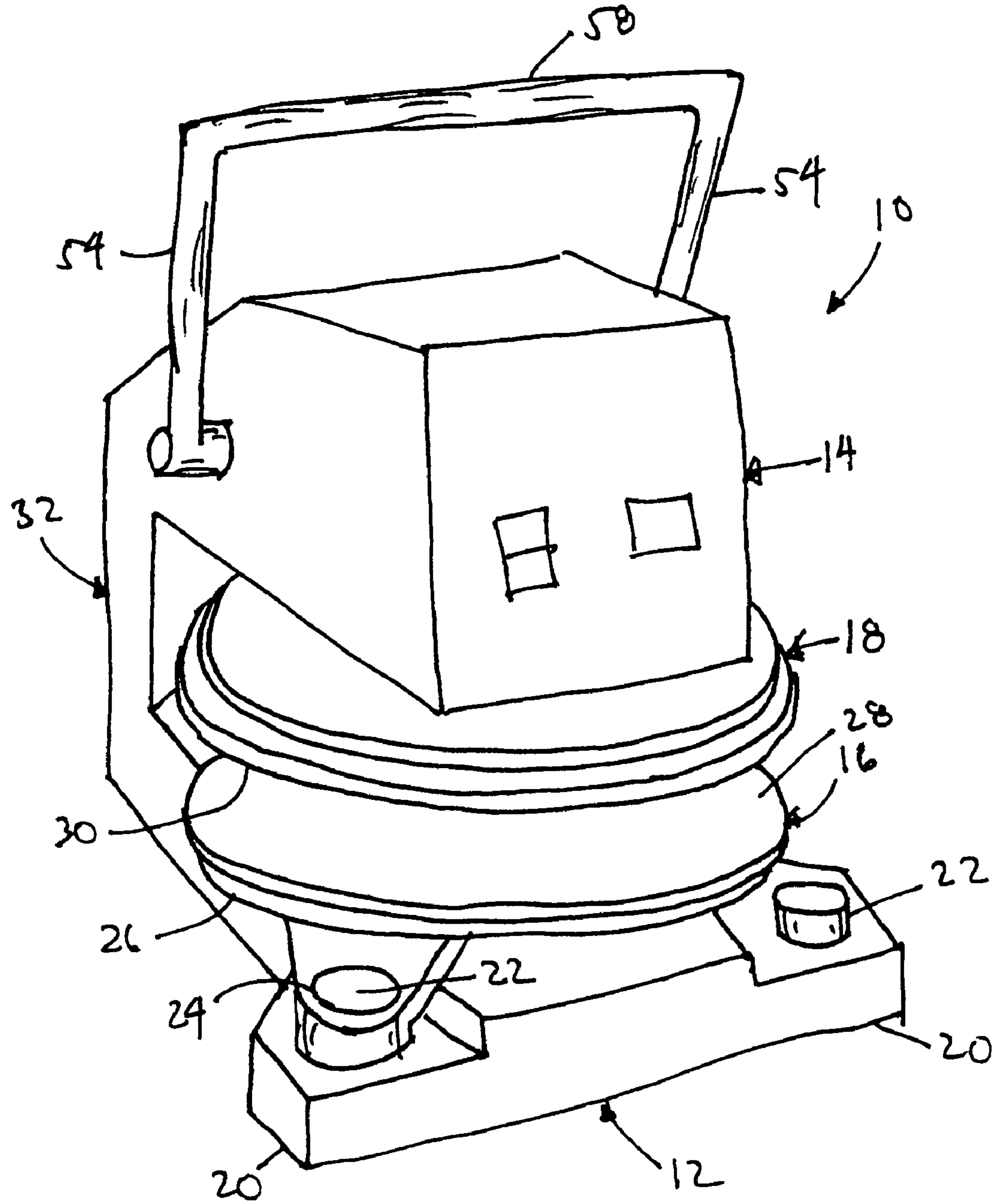
FIG. 1 is a perspective view of a dough press of the present invention.

The dough press 10 of the present invention is shown in the figures. The dough press 10 includes frame 32 that has a base 12 supporting a lower platen 16 and an upper housing 14 supporting an upper platen 18. The platens 16, 18 are supported substantially horizontally and substantially in parallel with each other. The upper housing 14 includes a drive mechanism whereby the upper platen 18 is manually moved toward and away from the lower platen 16. In the open position, the upper platen 18 is spaced from the lower platen 16. In the closed position, dough placed on the lower platen 16 is compressed between the upper platen 18 and lower platen 16.

Typically, the working surface 30 of the upper platen 18 and the working surface 28 of the lower platen 16, that is, the opposed surfaces that make contact with the dough being worked, are flat. The result after pressing is a flat sheet of dough. The present invention, however, contemplates that the working surfaces 28, 30 may include grooves for forming ridges in the dough sheet or protrusions for forming depressions in the dough sheet.

As indicated, the base 12 provides support for the lower platen 16. Extending from a front corner of the base 12 is a wing 20 with an upwardly extending cylindrical projection 22. The lower platen 16 has a cylindrical cavity 24 offset from the platen outer edge 26 that fits over the projection 22. The cavity 24 pivots on the projection 22 and facilitates moving the lower platen 16 horizontally between an aligned position, where the lower platen 16 is aligned with the upper platen 18, and a working position, where the working surface 28 of the lower platen 16 is exposed and accessible to the operator for removing dough from and placing dough on the lower platen working surface 28. Alternatively, the projection and cavity are reversed, that is, the wing 20 has a cylindrical cavity (not shown) and the lower platen 16 has a cylindrical projection that fits in the cavity.

Optionally, there are wings 20 with projections 22 or cavities at both left and right front corners, as in FIG. 1. With this arrangement, the dough press 10 can be configured to allow the lower platen 16 to swing out from the left side or the right side in order to accommodate the preference of the operator.

Figure 2:
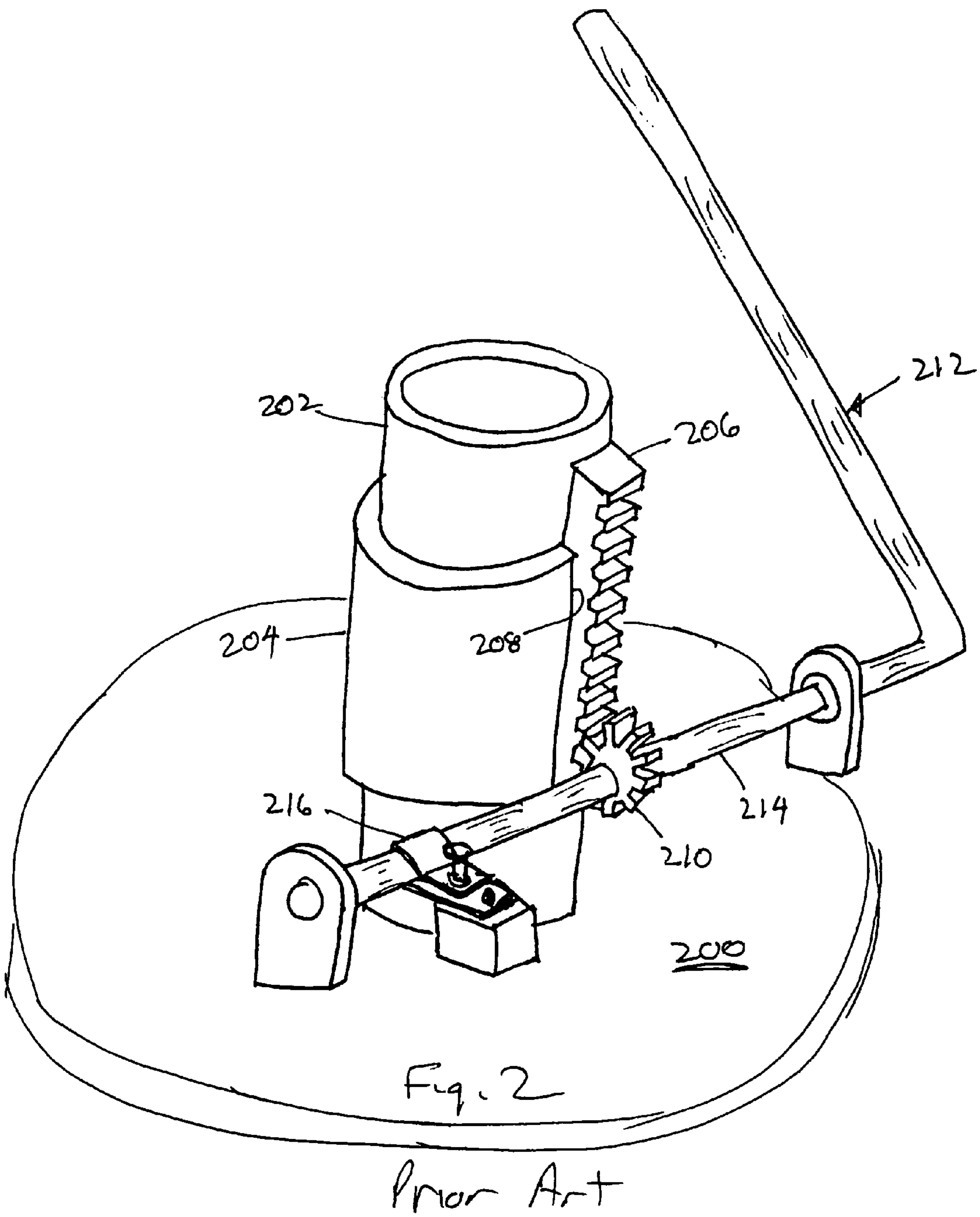
FIG. 2 is a perspective view of platen lowering and counterbalance mechanisms of dough presses of the prior art.

The upper housing 14 houses the mechanism by which the operator raises and lowers the upper platen 18. As described above and shown in FIG. 2, prior art dough presses use a shaft reciprocating through a cylinder to provide stability to the platen as it is raised and lowered, the disadvantage being that the lubricant necessary for smooth operation may contaminate the working surface of the platen and the dough that is being worked.

Figure 3:
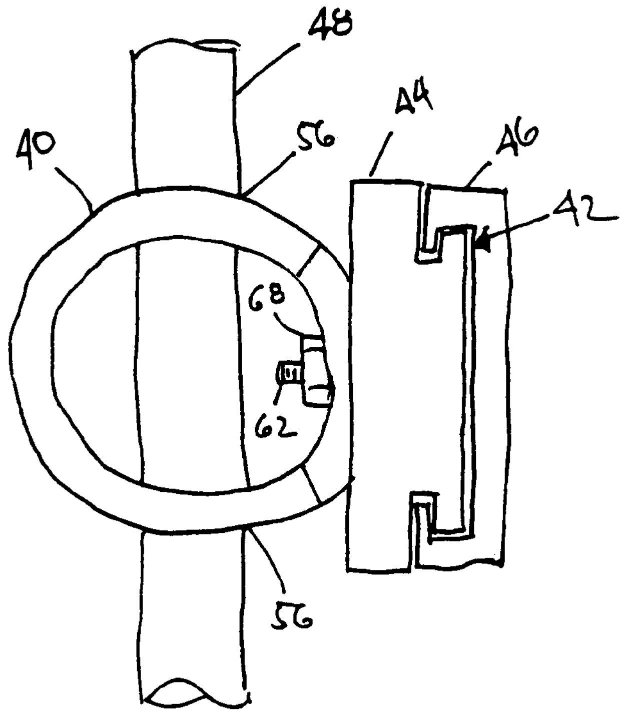
FIG. 3 is a top view of an example of an interlocking profile.

One aspect of the present invention involves a solution to the above-described contamination and orientation adjustment problem. The shaft/cylinder design is replaced with an sliding interlocking design 42, as shown in FIG. 3. The upper platen 18 is attached to the bottom of a shaft 40 that reciprocates through a hole in the bottom of the upper housing 14. A male component 44 is secured to the side of the shaft 40, a complementary female component 46 is rigidly secured to and within the upper housing 14, wherein the male component 44 reciprocates vertically within the female component 46. The interlocking design 42 prevents the shaft from skewing sideways as it moves vertically, keeping the operational surfaces of the platens 16, 18 parallel and aligned with each other. One requirement of the interlocking components 44, 46 is that they be long enough so that there is adequate overlap between the interlocking components 44, 46 to prevent the shaft 40 from skewing through the entire range of travel of the shaft 40. Thus, the contamination problem is solved because any lubrication that is required for smooth operation of the interlocking components is away from the shaft 40 and upper platen 18.

Figure 4:
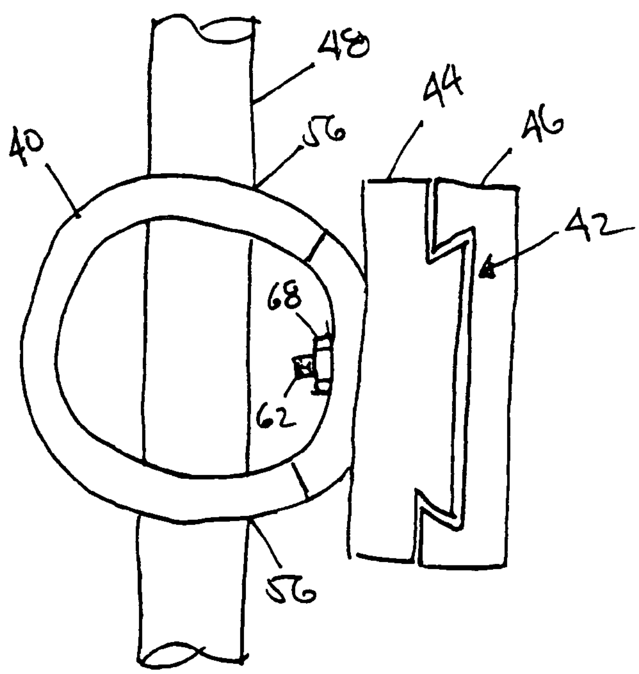
FIG. 4 is a top view of an example of an alternative interlocking profile.

The present invention contemplates that the interlocking components may have a different cross-sectional profile from the rectangular flanged profile shown in FIG. 3, as long as they function in the same way as the dovetail profile. FIG. 4 shows an example of a dovetail profile that may be employed by the present invention. The profile of FIG. 4 uses acute-angle corners, rather than right-angle corners. Another example is a profile similar to that of FIG. 3 but with rounded corners.

The above-described interlocking design indicates that the male component 44 is secured to the shaft 40 and the female component 46 is mounted in the upper housing 18. The present invention also contemplates that the components may be reversed, that is, the male component may be mounted in the upper housing and the female component may be mounted to the shaft. Thus, the remainder of the specification refers to the component mounted to the upper housing as the fixed interlocking component or the fixed component, and the component mounted to the shaft as the reciprocating interlocking component or the reciprocating component.

Figure 5:
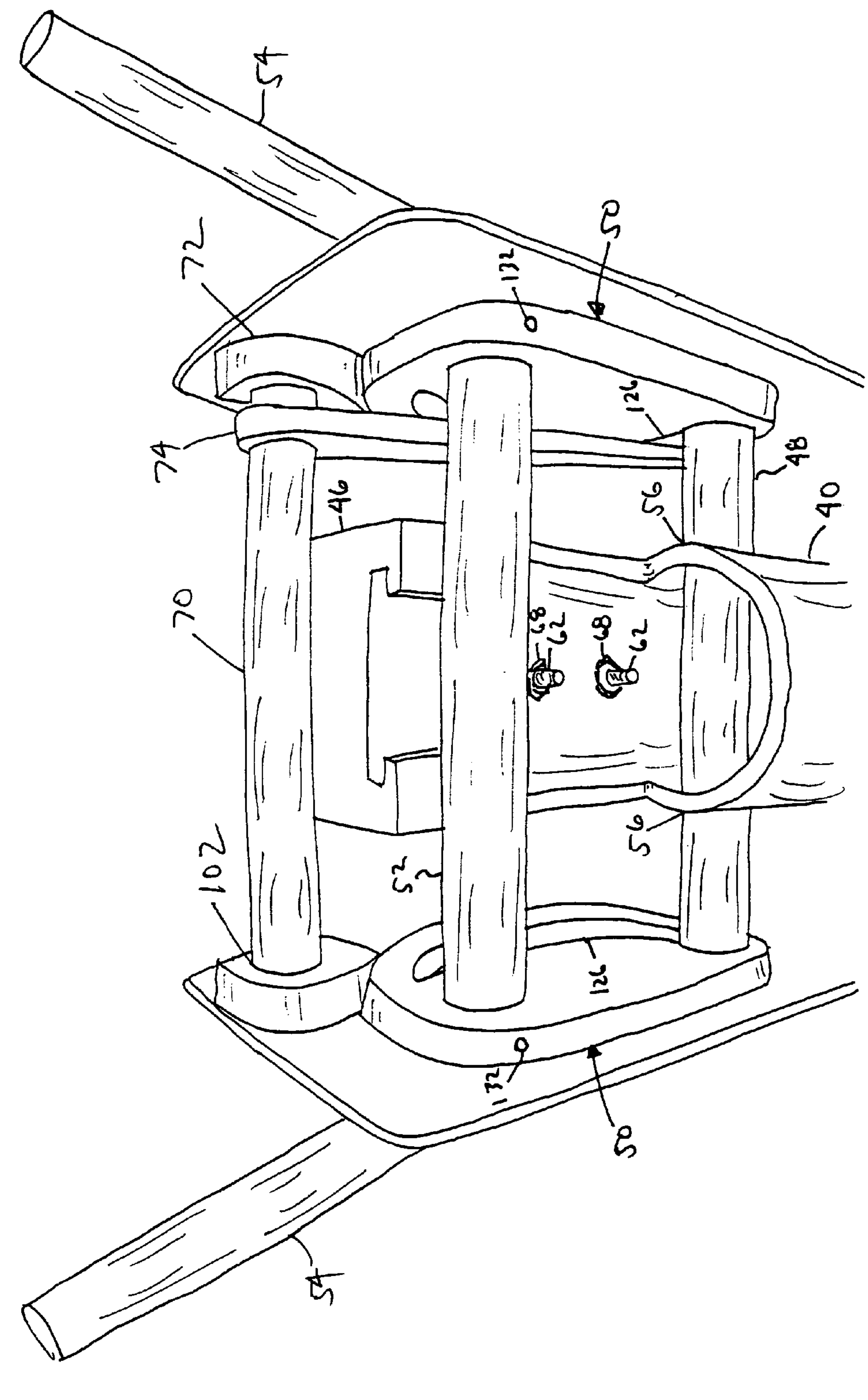
FIG. 5 is a perspective view of the drive mechanism of the present invention in the lowered position.
Figure 6:
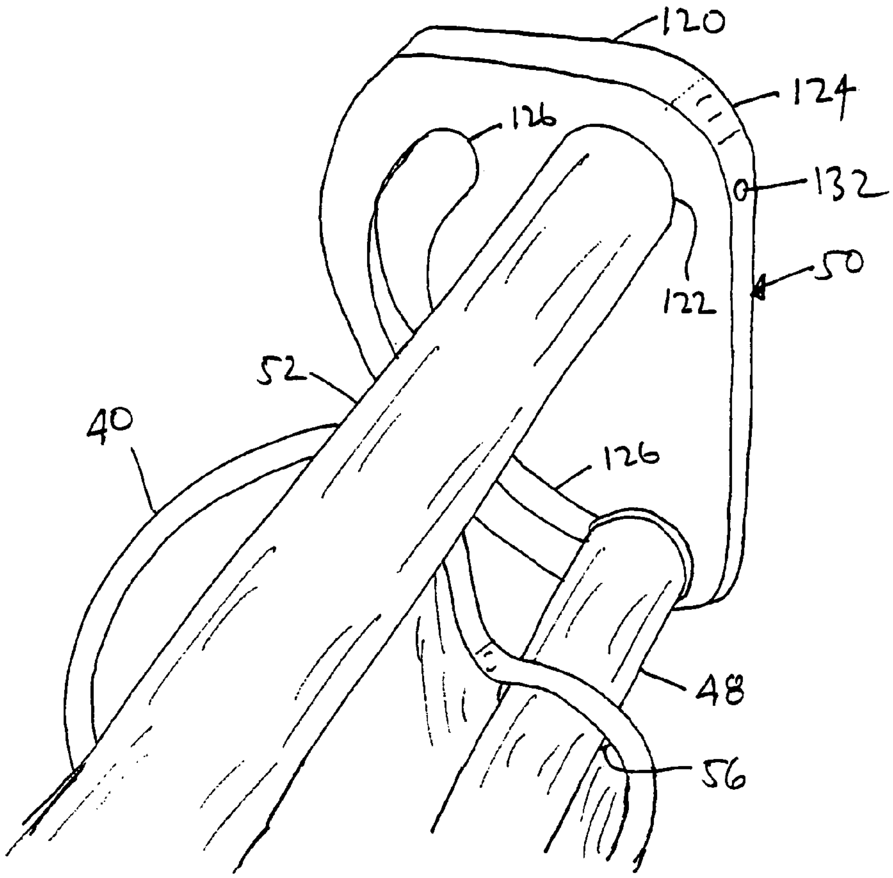
FIG. 6 is a perspective view of one side of the drive mechanism of the present invention of FIG. 5.
Figure 7:
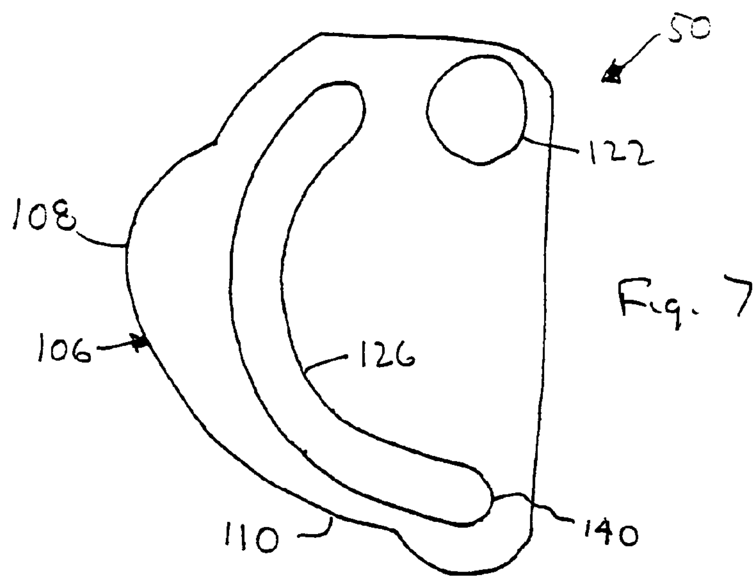
FIG. 7 is an elevational view of the cam of FIG. 5.
Figure 8:
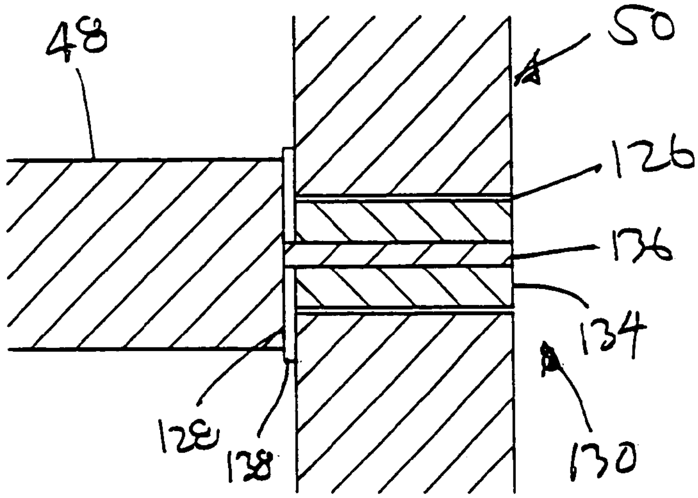
FIG. 8 is a cross sectional view of the rod end within the cam slot of FIG. 5.

A drive mechanism, shown in FIGS. 5 and 6, moves the shaft 40 up and down. The drive mechanism includes a horizontal rod 48 extending perpendicularly through holes 56 in the shaft 40 and a pair of cams 50 fixed to an axle 52. Each cam 50, one of which is shown in detail in FIG. 7 and the other being a mirror image, is an approximately quarter-oval shaped disc 120 with a mounting hole 122 for the axle 52 at the right-angle corner 124 and a spiral slot 126. The axle 52 is fixed in the mounting hole 122 by one or more set screws 132. As the slot 126 extends around the mounting hole 122, the distance from the hole 122 increases. Each end 128 of the rod 48 includes a bearing 130 that rides in the slot 126. As shown in FIG. 8, the bearing 130 includes a roller 134 on a spindle 136 extending from the rod end 128. A washer 138 fits between the rod end 128 and cam 50 to reduce friction. The roller 134 is preferably composed of a low friction, rigid plastic, as is well-known in the art. The present invention also contemplates that the bearing 130 can be any mechanism that allows the rod 48 to slide within the slot 126.

The axle 52 is driven by a handle 54 external to the housing 14 and accessible to the operator. Preferably, the handle 54 is mounted to pivot up and down, although this orientation is merely one of convenience based on ease of design, ease of use, and familiarity with dough presses of the prior art. Optionally, there are two handles 54, one on each side of the press 10, as shown in FIG. 5, for use by either the left or right hand. Optionally, there is a bar 58 extending between the two handles 54, as shown in FIG. 1. As the operator pivots the handle 54 up or down, the cams 50 rotates. As the cams 50 rotates, the slots 126 causes the rod 48 to move vertically. Vertical motion of the rod 48 causes the shaft 40 and upper platen 18 to reciprocate. Obviously, whether the platen 18 moves up or down depends upon the direction of rotation of the cams 50.

Optionally, the present invention incorporates a latching mechanism that retains the upper platen 18 in the closed position if the operator releases the handle 54. In some prior art dough presses, the operator must maintain pressure on the handle for a significant period of time to cause the dough to maintain its flattened shape after the platens 16, 18 are separated. This can cause fatigue in the operator after a time. In other prior art presses, mechanical complexity is added to maintain pressure without the operator.

To provide the latching mechanism, the outermost end 140 of the cam spiral slots 126 is shaped so that the rod ends rollers 134 latch into the outermost end 140 of the slot 126. In all but the outermost end 140 of the slot 126, when there is upward pressure on the upper platen 18, such as by the dough resisting compression, the roller 134 has a tendency to ride in the slot 126, allowing the upper platen 18 to rise. The outermost end 140 of the slot 126 is shaped so that the minimal upward pressure on the upper platen 18 from the dough's resiliency causes the roller 134 to push against the closed end of the slot 126, rather than the other direction. This has the effect of latching the upper platen 18 into the closed position, maintaining compression on the dough. Minimal upward pressure by the operator is enough to overcome the latching effect and raise the upper platen 18.

Figure 9:
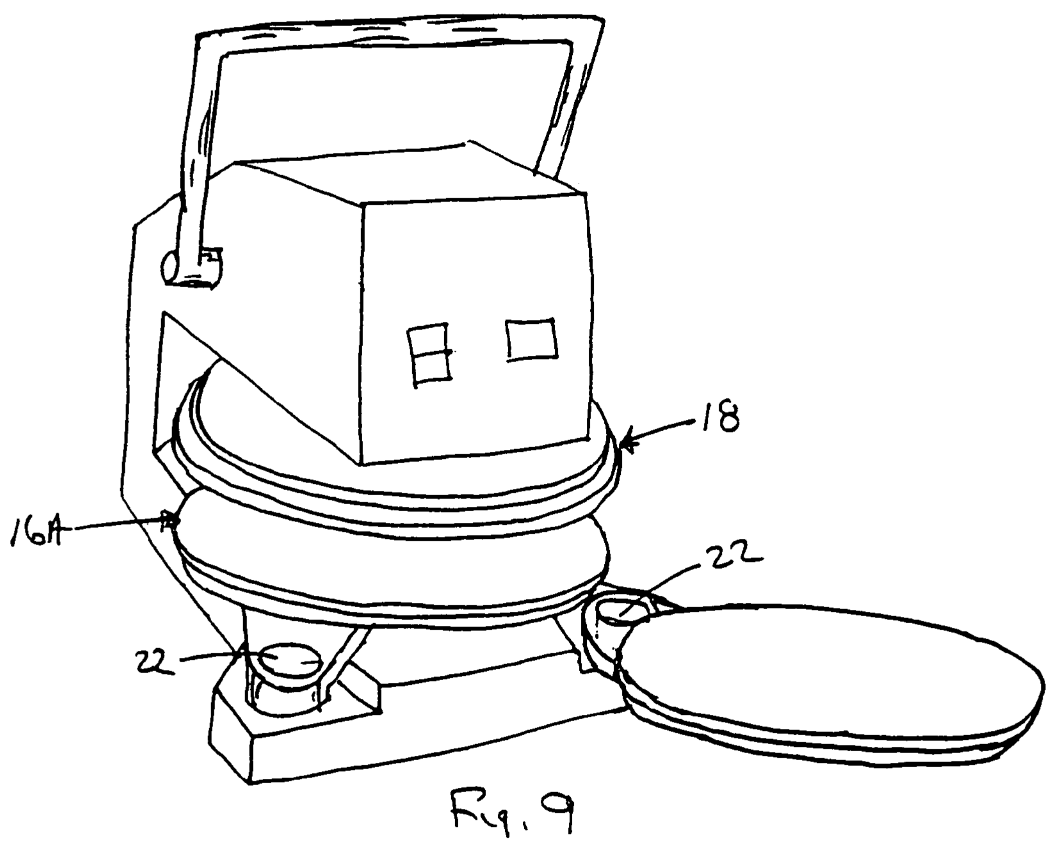
FIG. 9 is a perspective view of a dough press of the present invention configured with two lower platens.

The latching mechanism provides another benefit. As described above, the dough press 10 optionally provides for the lower platen 16 to swing out from the left side or the right side in order to accommodate the preference of the operator. This configuration, when coupled with a latching mechanism, can enhance productivity. As shown in FIG. 9, the operator can install a first lower platen 16A on the left side and a second lower platen 16B the right side. While the upper platen 18 is latched in the closed position on the first lower platen 16A, the operator can be placing dough on the second lower platen 16B. When the dough is ready to be removed from the first lower platen 16A, the upper platen 18 is raised, the first lower platen 16A is swung away, the second lower platen 16B is swung into position under the upper platen 18, and the upper platen 18 is lowered and latched in the closed position. Now the operator can remove the flattened dough from the first lower platen 16A and place new dough while the dough on the second lower platen 16B is being flattened. Productivity can as much as double. The present invention contemplates that a dough press implementing the two lower platen configuration can implement any drive mechanism that incorporates an adequate latching mechanism, including drive and latching mechanisms known in the prior art.

Figure 10:
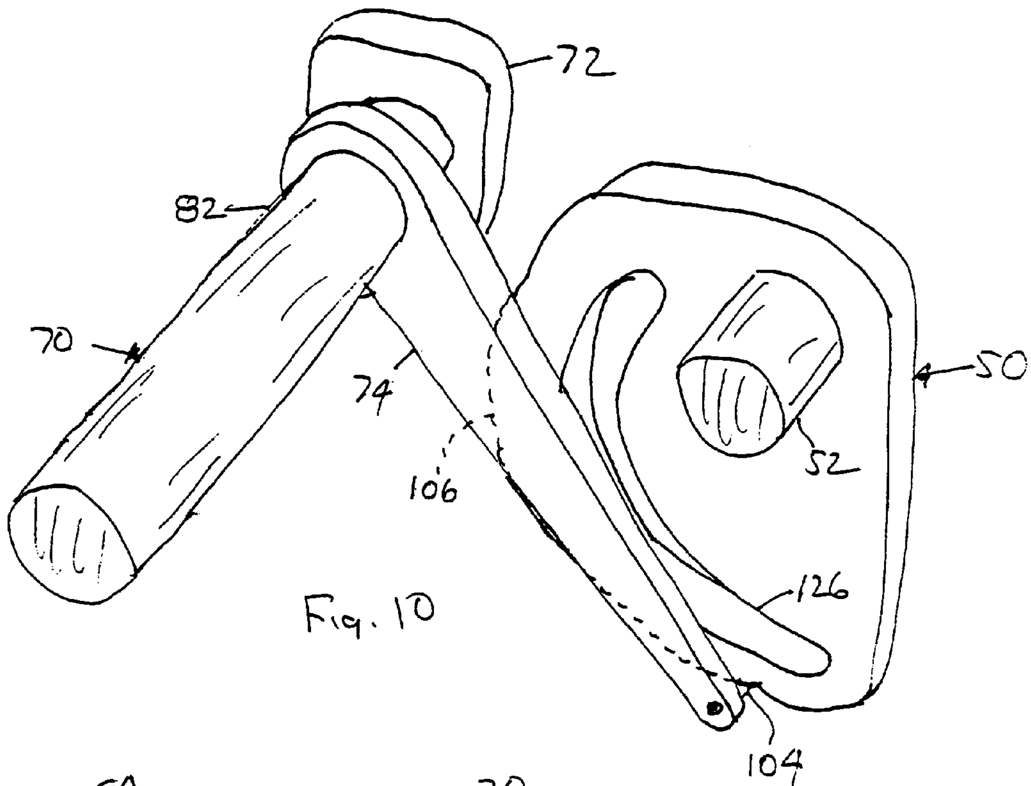
FIG. 10 is a rear perspective view of the counterbalance mechanism of FIG. 5.
Figure 11:
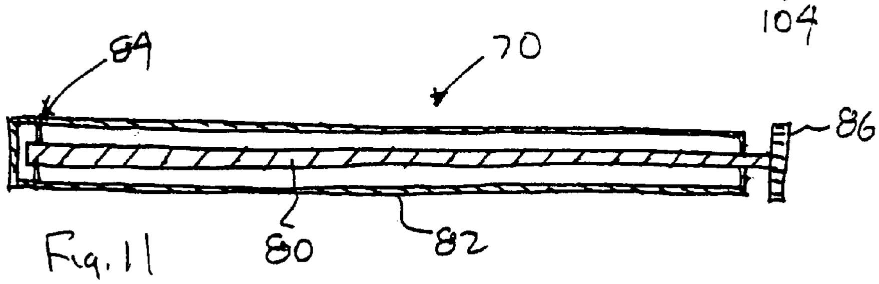
FIG. 11 is a cross-sectional view of a basic torsion bar assembly employed by the present invention.

Another aspect of the present invention is the manner in which the upper platen 18 is retained in any vertical position placed by the operator. As described above, dough presses of the prior art utilize a collar tightened around the handle axle that require relatively frequent adjustment and maintenance. The present invention employs a substantially different mechanism that relies upon spring tension to maintain the desired position for the upper platen 18. As shown in FIGS. 5 and 10, the counterbalance mechanism includes a torsion bar assembly 70, a terminator 72, a cam follower arm 74, and a cam face 106. The torsion bar assembly 70, shown in detail in FIG. 11, consists of an elongated torsion member 80 within a sleeve 82. One end of the torsion member 80 is fixed to the sleeve 82, as at 84, and the other end of the torsion member 80 ends in a device 86 for securing the torsion member 80 to an external frame. In operation, as the sleeve 82 is rotated, it causes the torsion member 80 to twist longitudinally, increasing the stored mechanical energy. When the rotational force is removed, the stored energy is released, causing the torsion member 80 to return to its normal, untwisted state.

Figure 12:
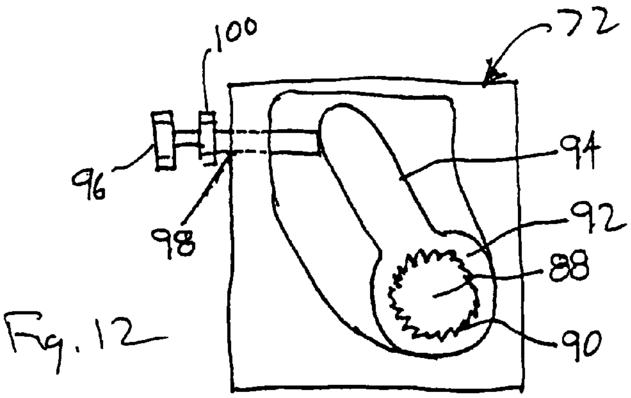
FIG. 12 is a detailed view of the torsion bar assembly adjustment mechanism.

The terminator 72 is fixed within the upper housing 14. As shown in FIG. 12, the device 86 for securing the torsion member 80 is a toothed wheel 88 that meshes with a toothed round hole 90 in a disk 92 within the terminator 72. The terminator 72 includes a mechanism for rotating the torsion member 80 in order to adjust the tension provided by the torsion bar assembly 70 as needed. An arm 94 extends from the disk 92 and a screw 96 turns into and out of a threaded hole 98 in the terminator 72 to set the position of the arm 94. A locking nut 100 secures the screw 96 in position after adjustment. The tension is adjusted so that the force provided by the torsion bar assembly 70 evenly counters the weight of the platen/shaft assembly. Typically, the tension needs to be adjusted during manufacture and rarely thereafter.

The other end of the torsion bar assembly 70 is rotatably secured to the upper housing 14, as at 102, to provide stability for rotation.

The cam follower arm 74 is fixed to the sleeve 82, extending radially from the torsion bar assembly 70. At the end of the cam follower arm 74 is a roller 104 with an axis that is parallel to the torsion bar assembly 70. The cam follower arm roller 104 rides on the cam face 106, which is the outer surface of one of the cams 50, so that, as the shaft 40 moves downwardly, the follower arm 74 pivots downwardly, causing the torsion bar assembly sleeve 82 to rotate and increasing the stored energy pushing against the downward motion of the shaft 40.

The nature of the torsion bar assembly 70 is that, as the rotational displacement of the sleeve 82 increases, the amount of force needed to continue to rotate the sleeve 82 increases. In other words, it is easier to rotate the sleeve 82 the first degree of displacement than it is to rotate the sleeve 82 the second degree of displacement. In order to smoothly counterbalance the upper platen 18, the profile of the cam face 106 is designed to compensate. In essence, the cam face profile must decrease the rate of rotation of the sleeve 82 as the platen 18 is lowered. An example of a preferred profile of the cam face 106 is shown in FIG. 7. When the upper platen 18 is at its upper travel limit, the open position, the follower arm roller 104 contacts the steeper section 108 of the cam face 106. As the cam 50 rotates to lower the upper platen 18, the roller 104 moves along the cam face 106. The steeper section 108 of the cam face 106 causes the most rotational displacement of the sleeve 82. As the roller 104 moves farther along the cam face 106 toward the shallower section 110, the rate of rotational displacement of the sleeve 82 decreases. The result is a relatively constant force along the entire travel of the upper platen 18. The present invention contemplates that the cam face 106 may be profiled as desired to provide more or less counterbalance at different positions in the platen travel.

In the dough presses of the prior art, the counterbalance mechanism produces friction in both directions of movement, so the operator is not only lifting the entire weight of the platen assembly, but is also fighting the friction imposed by the collar. On the other hand, the counterbalance mechanism of the present invention operates as a "power assist" for the operator, particularly when lifting the handle 58 to separate the platens 16, 18. Release of the energy stored in the torsion member 80 counters most of the weight of the upper platen 18 and shaft 40. In fact, it must do so in order for the counterbalance to operate to maintain the position of the platen 18 set by the operator. The power-assist feature is merely a convenient by-product.

Optionally, the upper plate 18 is capable of heating the dough as it is being flattened. Heating softens the dough, making it easier to work with. There are several methods known in the art to provide heat to the platen 18, including embedded heating elements in the platen and a heating element external to and abutting the platen 18. The present invention contemplates that any method of providing heat to the upper platen 18 may be used. Optionally, the lower platen 16 is provided with the capability to heat the dough.

Thus it has been shown and described a dough press which satisfies the objects set forth above.

Since certain changes may be made in the present disclosure without departing from the scope of the present invention, it is intended that all matter described in the foregoing specification and shown in the accompanying drawings be interpreted as illustrative and not in a limiting sense.

We claim:

1. A manually-operated dough press for use by an operator comprising:

(a) a frame having a base and a housing;

(b) a shaft extending downwardly from said housing through an opening and mounted for reciprocating movement through said opening;

(c) an upper platen attached to said shaft, said upper platen having a working surface;

(d) a pair of lower platens pivotably mounted to said base, each of said lower platens having a working surface opposed to and substantially parallel to said upper platen working surface, each of said lower platens pivotable between an aligned position, wherein said lower platen is in alignment with said upper platen, and a working position wherein said lower platen is not in alignment with said upper platen and said lower platen working surface is accessible to said operator, said pair of lower platens capable of being alternately pivoted into said aligned position, said working surfaces remaining opposed to and substantially parallel to said upper platen working surface when pivoting between said aligned position and said working position; and (e) a drive mechanism for reciprocating said shaft between an open position wherein said upper platen is spaced from said lower platen in said aligned position and a closed position wherein dough on said working surface of said lower platen in said aligned position is compressed between said upper platen and said lower platen in said aligned position, said drive mechanism including a mechanism for latching said upper platen in said closed position.

2. The dough press of claim 1 wherein said reciprocating movement of said shaft is provided by a pair of mating interlocking components, a first of said interlocking components within and sacred to said housing, a second of said interlocking components secured to said shaft within said housing and arranged for said reciprocating movement within said first of said interlocking components.

3. The dough press of claim 2 wherein said interlocking components interlock with a rectangular flanged profile.

4. The dough press of claim 1 wherein said drive mechanism includes a handle accessible to said operator, an axle controlled for rotation by said handle, a pair of cams spaced along said axle, each of said cams having a spiral slot, a rod fixed to said shaft between said cams, each end of said rod riding within one of said cam slots, whereby, as said handle is moved by said operator, said cams rotate, causing said rod to move vertically, causing said shaft to reciprocate.

5. The dough press of claim 4 wherein said latching mechanism includes outer ends of said spiral slots shaped such that upward pressure imparted on said upper platen caused by resiliency in said dough causes said rod ends to push against said spiral slot ends.

6. The dough press of claim 1 wherein said dough press further comprises a counterbalance for maintaining the position of said upper platen relative to said lower platen as set by said operator.

7. The dough press of claim 6 wherein said counterbalance includes a torsion bar assembly mounted within said housing, a cam face on one of said cams, and a cam follower arm attached to said torsion bar assembly and having an end remote from said torsion bar assembly, said cam follower arm remote end riding on said cam face, such that, as said upper platen moves toward said lower platen, said cam pushes said follower arm to cause stored mechanical energy in said torsion bar assembly to increase, and as said upper platen moves away from said lower platen, said stored mechanical energy transfers through said follower arm to aid movement of said upper platen away from said lower platen.

8. The dough press of claim 7 wherein said torsion bar assembly is adjustably mounted to said housing such that said stored mechanical energy is adjustable.

9. The dough press of claim 1 wherein said lower platens are independently pivotable between said aligned position and said working position.

10. The dough press of claim 1 wherein said lower platen axes are substantially parallel to said shaft.

* * * * *